Patented June 19, 1928.

1,674,128

UNITED STATES PATENT OFFICE.

ROBERT E. ROSE, OF WILMINGTON, DELAWARE, ASSIGNOR TO E. I. DU PONT DE NEMOURS & COMPANY, OF WILMINGTON, DELAWARE, A CORPORATION OF DELAWARE.

DISUBSTITUTED GUANIDINE SALTS OF DYES CONTAINING ACID GROUPS.

No Drawing. Application filed November 2, 1923. Serial No. 672,284.

This invention relates to water-insoluble colors or dyes, and comprises salts resulting from the combination of a substituted guanidine with a dyestuff containing an acid group in its molecule such, for example, as acid colors, direct colors, chrome colors, and certain eosine dyes.

One object of the present invention is to provide colors which will be useful in dyeing pyroxylin products and in coloring spirit varnishes. In the past, the number of colors suitable for such purposes has been small, as most commercial dyestuffs are insoluble in alcohol. This has been a disadvantage, because it has been difficult to find colors of any great fastness which are also spirit soluble. This discovery of mine should make it possible to use almost any color as an alcohol soluble product.

The substituted guanidines which I prefer to use are the diaryl-guanidines such as diphenylguanidine, di-ortho-tolylguanidine, and dixylyl-guanidine, but it will be understood that my invention is not limited to the use of these particular di-substituted guanidines. Any of these guanidines, in the form of acetate, gives, by double decomposition with the dye in aqueous solution, a precipitate of what we assume is the guanidine salt of said dye. These compounds are quite extraordinary in being soluble in alcohol, acetone, ethyl acetate and similar solvents which, in the great majority of cases, have no solvent action at all on the corresponding sodium salt.

Other substituted guanidines, which can be used to advantage in making alcohol soluble, water-insoluble colors are the tri-aryl-guanidines such, for example, as tri-phenyl-guanidine.

My invention may be illustrated by the following examples:—

1. 5 parts of pontamine yellow CH (Schultz #304), which is a stilbene dyestuff having the following formula:

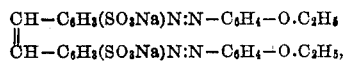

are dissolved in water, and to this solution enough di-xylyl-guanidine is added to precipitate all the color. (The di-xylyl-guanidine is previously dissolved by the addition of a slight excess of acetic acid.) The precipitate is filtered off, and after drying is ready for use. The product is a yellow solid which is readily soluble in acetone, methyl alcohol and ethyl acetate.

2. 5 grams of pontamine sky blue 6 BX (Schultz #424), a disazo dyestuffs made from dianisidine and 1, 8-aminonaphthol-2, 4-disulfonic acid and having the following formula:

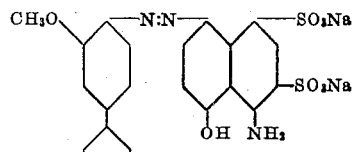

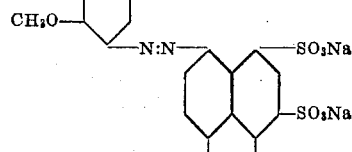

are dissolved in water, and enough di-o-tolyl-guanidine is added to precipitate all the color. The di-ortho-tolyl guanidine is added in the form of acetate in an aqueous solution. After standing for some time, the solution is filtered off and the new compound dried. It is a dark blue mass which is brittle, and is very readily soluble in alcohol, even in the cold, but especially on warming, and in acetone.

3. 5 grams of eosine, the sodium salt of tetra-brom-fluorescein, and having the following formula:

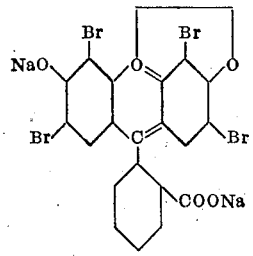

are dissolved in water, and enough di-phenyl guanidine acetate is added to precipitate the colored body. The suspension is either allowed to settle, washed by decantation, or filtered. When dry it is a vivid bluish red solid, extremely soluble in acetone, methyl alcohol, ethyl alcohol, as well as in ethyl acetate and solutions of pyroxlin.

4. 5 grams of crocein scarlet, a disazo dyestuff prepared from p-aminoazobenzene and G salt, and having the formula:

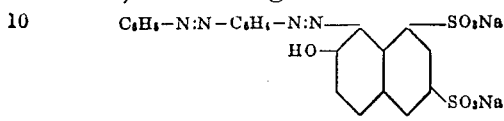

are dissolved in water and enough di-phenyl guanidine acetate is added to precipitate the colored body. The suspension is either allowed to settle, washed by decantation, or filtered. The product is a dark red powder soluble in acetone, methyl alcohol, ethyl alcohol, as well as in ethyl acetate and solutions of pyroxlin.

5. 5 grams of pontacyl green BL, a triphenylmethane dyestuff of the following formula:—

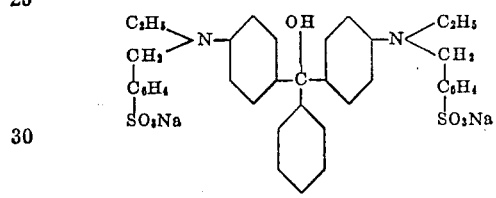

are dissolved in water and enough di-phenyl guanidine acetate is added to precipitate the colored body. The suspension is either allowed to settle, washed by decantation, or filtered. The product is soluble in acetone, methyl alcohol, ethyl alcohol, as well as in ethyl acetate and solutions of pyroxlin.

In the above examples the amount of substituted guanidines used will depend upon the number of carboxylic, or sulfonic acid groups in the dye molecule, one molecule of the base being required for each acid group in the dyestuff.

The proportion of water used in dissolving the dyestuff may vary widely, enough water being used, of course, for complete solution of the dyestuff.

The acetic acid used for dissolving the diarylguanidine may vary within wide limits; for instance, a 28% acetic acid or a glacial acetic acid can be used to convert the base into the acetate. The acetate, if completely formed, will give a clear solution in water. Excess acetic acid is not needed but it is also not objectionable.

Concerning the temperature employed: as a rule precipitation can best be carried out at room temperature, but in certain cases it may be found advisable to heat the solution in order to cause coagulation of the precipitate to facilitate its removal from the liquor. The temperature required to cause this coagulation varies between 60 and 100° C.

The use of the tri-substituted guanidines may be illustrated by the following example:

6. 5 grams of metanil yellow (Schultz #134) which is an azo dyestuff having the following formula:

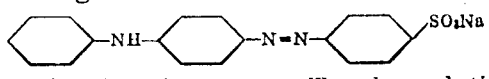

are dissolved in water. To the solution is added enough di-ortho-tolyl-phenyl-guanidine in the form of a soluble salt to cause complete precipitation. The precipitate is filtered off and after drying is ready for use. The product is a yellow solid soluble in acetone, methyl alcohol, ether and ethyl acetate.

In all instances herein where complete precipitation is mentioned, it is not to be taken that the solution in all cases becomes colorless, but that practically all of the dyestuff is precipitated, nevertheless.

It should be understood that my invention is generally applicable to all dyestuffs which are characterized by the presence of sulfonic acid groups or carboxyl groups; indeed, to all dyestuffs which give rise to colored anions when dissolved in aqueous solution. It is also applicable to dyes containing sulfonic acid groups, even though these do not form true solutions but only colloidal suspensions in water; for instance, the direct colors, such as benzo purpurine 4B.

Wherever the dyestuffs used in the present invention are defined as containing a strongly acid group, it is to be understood that this term is meant to include acid groups of a true acid nature, for instance, sulphonic acid groups, carboxyl acid groups, and the like. The term is not meant to include groups which may be said to be acidic, but which are not strongly so, for instance, applicant does not mean to include phenolic groups or the like.

It is to be understood that suitable changes and variations may be made in the details of the invention without departing from the spirit and scope thereof.

I claim:

1. As a new coloring matter, a diarylguanidine salt of a dyestuff which gives rise to colored anions when dissolved in an aqueous solution.

2. As a new coloring matter, a substituted guanidine salt of a dyestuff which gives rise to colored anions when dissolved in an aqueous solution.

3. As a new coloring matter, a di-substituted guanidine salt of a dyestuff which gives rise to colored anions when dissolved in an aqueous solution.

4. As new coloring matters, diphenylguanidine salts of dyes, said salts being insoluble in water.

5. As a new coloring matter, a poly-substituted guanidine salt of a dyestuff which gives rise to colored anions when dissolved in an aqueous solution.

6. The process of rendering a dyestuff containing a strongly acid group soluble in ordinary organic solvents, which comprises combining a water soluble di-substituted guanidine salt with a water soluble metallic salt of said dyestuff, by double decomposition.

7. The process of claim 6 in which the guanidine salt is a diaryl guanidine salt.

8. The process of claim 6 in which the guanidine salt is a diaryl guanidine acetate.

9. As a new coloring matter, a disubstituted guanidine salt of a water soluble dyestuff containing a strongly acid group.

10. As new coloring matters, diphenyl guanidine salts of dyestuffs containing strongly acid groups.

11. As a new coloring matter, a substituted guanidine salt of a water soluble dyestuff containing a strongly acid group.

In testimony whereof I affix my signature.

ROBERT E. ROSE.